United States Patent
Zhou et al.

(10) Patent No.: US 9,254,920 B2
(45) Date of Patent: Feb. 9, 2016

(54) AIRCRAFT ENERGY MANAGEMENT SYSTEM INCLUDING ENGINE FAN DISCHARGE AIR BOOSTED ENVIRONMENTAL CONTROL SYSTEM

(75) Inventors: Rui Zhou, Niskayuna, NY (US); Stephen Francis Winter, Cincinnati, OH (US); Athanasios Kyriazopoulos, Roscoe, IL (US); Jones Ricardo Muller, Roscoe, IL (US); Javier Armando Parilla, Cincinnati, OH (US)

(73) Assignees: General Electric Company, Niskayuna, NY (US); Embraer S.A., Sao Jose dos Campos, Sao Paulo (BR)

(*) Notice: Subject to any disclaimer, the term of this patent is extended or adjusted under 35 U.S.C. 154(b) by 898 days.

(21) Appl. No.: 13/483,752

(22) Filed: May 30, 2012

(65) Prior Publication Data

US 2013/0318983 A1 Dec. 5, 2013

(51) Int. Cl.
*B64D 13/06* (2006.01)
*F02C 6/08* (2006.01)
*F02K 3/06* (2006.01)
*B64D 15/04* (2006.01)

(52) U.S. Cl.
CPC . *B64D 13/06* (2013.01); *F02C 6/08* (2013.01); *F02K 3/06* (2013.01); *B64D 15/04* (2013.01); *B64D 2013/0607* (2013.01); *B64D 2013/0618* (2013.01); *Y02T 50/44* (2013.01); *Y02T 50/56* (2013.01); *Y02T 50/672* (2013.01)

(58) Field of Classification Search
CPC ............... F02C 6/04; F02C 6/08; F02C 6/18; F02C 9/18; F02C 7/32; B64D 13/06; B64D 13/08; B64D 13/02; F02K 3/06; F02K 3/025

USPC ............. 60/785, 726, 801, 262; 62/172, 401, 62/402

See application file for complete search history.

(56) References Cited

U.S. PATENT DOCUMENTS

| | | | |
|---|---|---|---|
| 4,261,416 A * | 4/1981 | Hamamoto | 165/271 |
| 5,442,905 A * | 8/1995 | Claeys et al. | 60/785 |
| 5,956,960 A | 9/1999 | Niggeman | |
| 6,216,981 B1 | 4/2001 | Helm | |
| 6,305,156 B1 * | 10/2001 | Lui | 60/785 |
| 6,526,775 B1 * | 3/2003 | Asfia et al. | 62/402 |
| 6,629,428 B1 | 10/2003 | Murray | |
| 6,928,832 B2 | 8/2005 | Lents et al. | |
| 7,171,819 B2 * | 2/2007 | Lui et al. | 62/172 |

(Continued)

OTHER PUBLICATIONS

Fischer, Anthony, "Future Fuel Heat Sink Thermal Management System Technologies: Tracking Number: 5958"; 4th International Energy Conversion Conference and Exhibit (IECEC); Jun. 2006, pp. 26-29, San Diego, CA; USA.

(Continued)

*Primary Examiner* — Steven Sutherland
(74) *Attorney, Agent, or Firm* — Scott J. Asmus (57) ABSTRACT

An aircraft energy management system including a cabin air compressor adapted to be coupled to a source of fan discharge air at a first pressure during an inflight operating mode and adapted to be coupled to a ram intake air during a ground operating mode. The system further including an environmental control system mechanically coupled to a compressor exit of the cabin air compressor. The aircraft energy management system configured to provide a conditioned fluid flow to an aircraft cabin, cockpit or de-icing system.

20 Claims, 8 Drawing Sheets

(56) References Cited

U.S. PATENT DOCUMENTS

| | | | |
|---|---|---|---|
| 7,624,592 B2* | 12/2009 | Lui et al. | 62/402 |
| 7,849,702 B2 | 12/2010 | Parikh | |
| 2008/0264084 A1 | 10/2008 | Derouineau et al. | |
| 2010/0170262 A1* | 7/2010 | Kaslusky et al. | 60/778 |

OTHER PUBLICATIONS

Springer, Timothy A; McNamara, James E; Lentz, John C; Wigmore, David B. Sae, International Conference on Environmental Systems, 22nd, pp. 13-16 Jul. 1992. (Jul. 13, 1992), Seattle, WA; United States.

* cited by examiner

AIRCRAFT ENERGY MANAGEMENT SYSTEM INCLUDING ENGINE FAN DISCHARGE AIR BOOSTED ENVIRONMENTAL CONTROL SYSTEM

BACKGROUND

Embodiments disclosed herein relate generally to aircraft energy management systems including environmental control systems and more particularly to methods and apparatus for extracting fan discharge air to boost an aircraft environmental control system.

Turbine-powered aircraft conventionally incorporate environmental control systems (ECS) which control aircraft cabin temperature by the amount and temperature of a bleed air extracted from an engine. Historically, ECS have used engine bleed air that is extracted from a high pressure compressor (HPC) or is generated by means of a compressor that is driven by an auxiliary gas turbine ("APU"), throttled (pressure reduced), and cooled by a heat exchanger ("precooler") using fan bleed air. Bleed air is also used to provide anti-icing to the aircraft, and must be at high temperature for this purpose—typically about 204° C. (400° F.).

Aircraft weight is a current concern in the current industry, with a decrease in aircraft weight resulting in an efficiency increase. In light of the concern, future aircraft will replace some or all of their metallic structures with composite materials to reduce weight and improve overall efficiency. These structures have limited temperature capability compared to metal alloys. For example, a typical carbon-fiber composite material may have a temperature limit substantially below 93° C. (200° F.). Conventional ECS interfaces, utilizing engine bleed air cannot meet this requirement without significantly increasing the size of an included precooler. Furthermore, composite aircraft will often use electrically powered anti-ice systems and therefore do not require high temperature bleed air.

One way ECS requirements have been met in composite aircraft, is by using electrically driven ECS to pressurize and condition ambient air. While effective to provide low-pressure, low-temperature bleed air, this requires a separate air inlet to efficiently entrain ambient fresh air, an additional air intake for cooling and considerable electrical power to drive the ECS compressors. The electrical power requirements can require an undesirable increase in the size of the engine mounted generators. In addition, the air intakes will produce drag on the aircraft, translating to an increase in fuel burn and therefore cost of operation. These weight and drag penalties of electrically driven ECS are also of concern in smaller aircraft.

Accordingly, there is a need for an improved environmental control system and method for extracting engine discharge air that will reduce aircraft weight and minimize drag air penalties.

BRIEF SUMMARY OF THE INVENTION

These and other shortcomings of the prior art are addressed by the present disclosure, which provides an aircraft energy management system that provides an engine fan discharge air boosted aircraft environmental control system which is effective to extract fan discharge air from a turbine engine and provide airflow to an aircraft environmental control system. The aircraft energy management system is configured to benefit from the fan pressure ratio and reduced ram air drag losses, while minimizing overall aircraft weight.

In accordance with an embodiment, an aircraft energy management system is provided. The aircraft management system including a cabin air compressor and an environmental control system mechanically coupled to a compressor exit of the cabin air compressor. The cabin air compressor is adapted to be coupled to a source of fan discharge air at a first pressure during an inflight operating mode and adapted to be coupled to a ram intake air during a ground operating mode.

In accordance with another embodiment, an aircraft energy management system is provided. The aircraft management system including a gas turbine engine, a cabin air compressor mechanically coupled to the gas turbine engine and an environmental control system mechanically coupled to the cabin air compressor. The gas turbine engine comprising a turbomachinery core including a high pressure compressor, a combustor, and a high pressure turbine in serial flow relationship. The core is operable to produce a first pressurized flow of air and a low pressure turbine disposed downstream of the core and operable to drive a fan to produce a second pressurized flow of air. The cabin air compressor having a compressor inlet coupled to the fan and a fresh air intake. The cabin air compressor is configured to receive the second pressurized flow of air from the fan during an inflight operating mode and a ram air fluid flow at a second pressure during a ground operating mode and discharge a compressed fluid flow at a third pressure substantially higher than the first pressure and the second pressure. The environmental control system is mechanically coupled to the cabin air compressor and having an inlet coupled to a compressor exit of the cabin air compressor to receive the compressed fluid flow and discharge a conditioned fluid flow.

In accordance with yet another embodiment, a method of extracting fan discharge air from a gas turbine engine in an energy management system is provided. The method including extracting a fan discharge air flow at a first temperature and a first pressure from a fan of the engine; compressing the fan discharge air flow through a cabin air compressor so as to increase its temperature and pressure and discharge a compressed fluid flow at a second temperature and a second pressure; and passing the compressed fluid flow through an environmental control system mechanically coupled to the cabin air compressor and discharging a conditioned fluid flow.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

Figure 1:
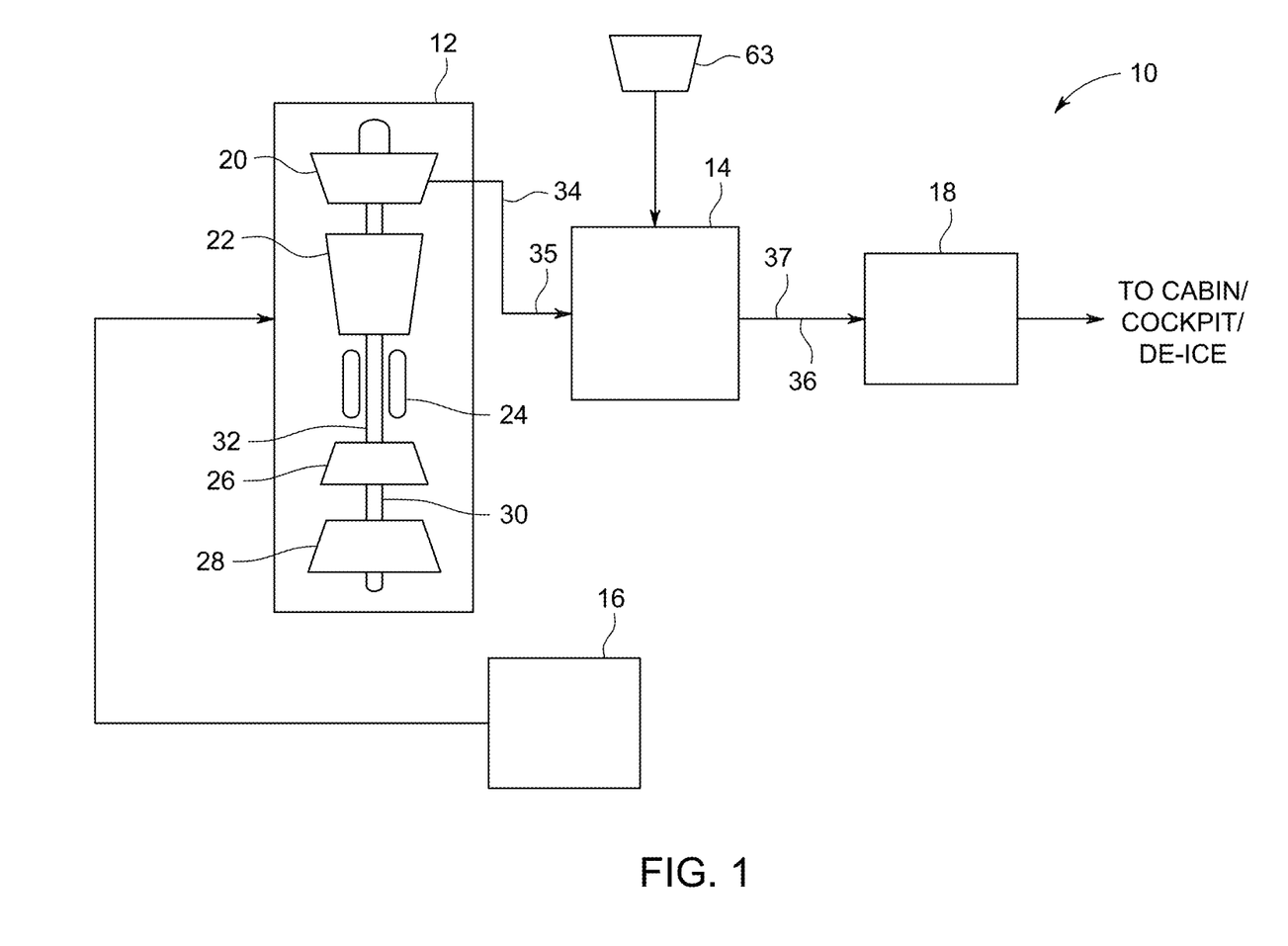
FIG. 1 is a schematic diagram of an aircraft energy management system incorporating engine fan discharge air constructed in accordance with an embodiment.

Referring to the drawings wherein identical reference numerals denote the same elements throughout the various views, FIG. 1 depicts in a simplified block diagram, elements of an exemplary aircraft energy management system 10 including a gas turbine engine 12 in fluidic communication with an electrically driven cabin air compressor (CAC) 14, a means for providing ground power 16 and an environmental control system (ECS) 18. The engine 12 having an engine fan 20, a high pressure compressor 22, a combustor 24, a high pressure turbine 26, and a low pressure turbine 28, all arranged in a serial, axial flow relationship. Collectively the high pressure compressor 22, the combustor 24, and the high pressure turbine 26 are referred to as a "core" 25. The fan 20 providing intake air to the high pressure compressor 22. The high pressure compressor 22 provides compressed air that passes into the combustor 24 where fuel is introduced and burned, generating hot combustion gases. The hot combustion gases are discharged to the high pressure turbine 26 where they are expanded to extract energy therefrom. The high pressure turbine 26 drives the compressor 22 through a shaft 30. Pressurized air exiting from the high pressure turbine 26 is discharged to the low pressure turbine 28 where it is further expanded to extract energy. The low pressure turbine 28 drives the fan 20 through an inner shaft 32. The fan 20 generates a flow of pressurized air, a portion of which supercharges the inlet of the high pressure compressor 22, a portion of which is provided as discharge air 34 to the cabin air compressor 14, and another portion of which bypasses the "core" to provide the majority of the thrust developed by the engine 10. While not shown in FIG. 1, it will be understood that the engine fan 20, the high pressure compressor 22, the combustor 24, the high pressure turbine 26, and the low pressure turbine 28 are all enclosed in a suitable housing(s) and that the shafts 30, 32 are supported in bearings of a known type to absorb thrust and radial loads.

The engine 10 is in fluidic communication with the downstream positioned cabin air compressor 14. In an embodiment, the cabin air compressor 14 is electrically powered via power extracted from the engine 10 during flight mode or via the means for providing ground power 16. More particularly, during flight, all electrical power required to power the CAC 14 is extracted from the main engine 10. In an alternate embodiment, the CAC 14 is configured as a bleed driven or shaft driven compressor. In an embodiment, during ground mode operation, the means for providing ground power 16 may be comprised of an external auxiliary power unit (APU), wherein power and air requirements are packaged for use when the aircraft is on the ground, thereby minimizing the need to power the aircraft's on-board APU or engine 10. The means for ground power 16 allows for aircraft cockpit and cabin conditioning without the need to operate the main engine 10. In a preferred embodiment, the means for providing ground power 16 is an APU delivering electric power only. Additionally, it is anticipated that the means for ground power 16 may be provided by any alternate means for providing power known in the art, such as, but not limited to, ground power unit, or the like.

In the illustrated example, the energy management system 10 further includes a ram air intake 63 in fluidic communication with the CAC 14, and more particularly the CAC compressor (described presently). In accordance with conventional practice, the ram air intake 63 is selectively opened or closed by an actuator of a known type in response to control signals, to control the intake of ram air to the CAC compressor 14 while the aircraft is on the ground and when the aircraft is in flight. More specifically, in an embodiment the ram air intake 63 includes a door (not shown) that is opened when the aircraft is on the ground and closed when the engine 12 is started and the air intake for the CAC 14 is switched to the engine fan discharge fluid flow 34.

In the embodiment illustrated in FIG. 1, the discharge air 34 entering the CAC 14 is obtained from the engine fan 20, as engine fan discharge air 34 via an inlet duct 35, or from the ram air intake 63, dependent upon mode of operation. During a flight mode of operation, providing discharge air 34 to the CAC 14 enables the CAC 14 to benefit from the pressure rise through the engine fan 20 and reduced ram air drag losses. The fluid flow 36 is pressurized air whose pressure is raised by the CAC 14. In addition to providing for heating or cooling, it may be used for purposes such as anti-icing or de-icing, pressurization and operating pneumatic equipment. In the described embodiment it may be used for an environmental control system (ECS) 18. It is necessary to supply the ECS 18 with this fan discharge air 34 as a first compressed fluid flow 36 via a duct 37 at specified temperature and pressure conditions, and at a sufficient mass flow rate.

The CAC 14 described herein is configured to receive fan discharge air 34, and provides a low pressure, low temperature interface to the engine 12 that is compatible with the temperature limitations of carbon-fiber composite wing, weight restrictions and minimization of drag losses of aircraft. The CAC 14 provides a high pressure and high temperature interface and boosted power to the ECS 18 through a first compressed air flow 36 without adversely increasing the size and thus weight of the overall energy management system 10.

Referring now to FIGS. 2-7, illustrated are embodiments of the energy management system 10 including alternate environmental control systems and illustrating operation in cooling, partial cooling and heating modes, both during flight and when the aircraft is on ground. It should be understood that in the illustrated alternative operation modes, specific system elements may be shown in phantom to indicate non-use during that specific mode.

Figure 2:
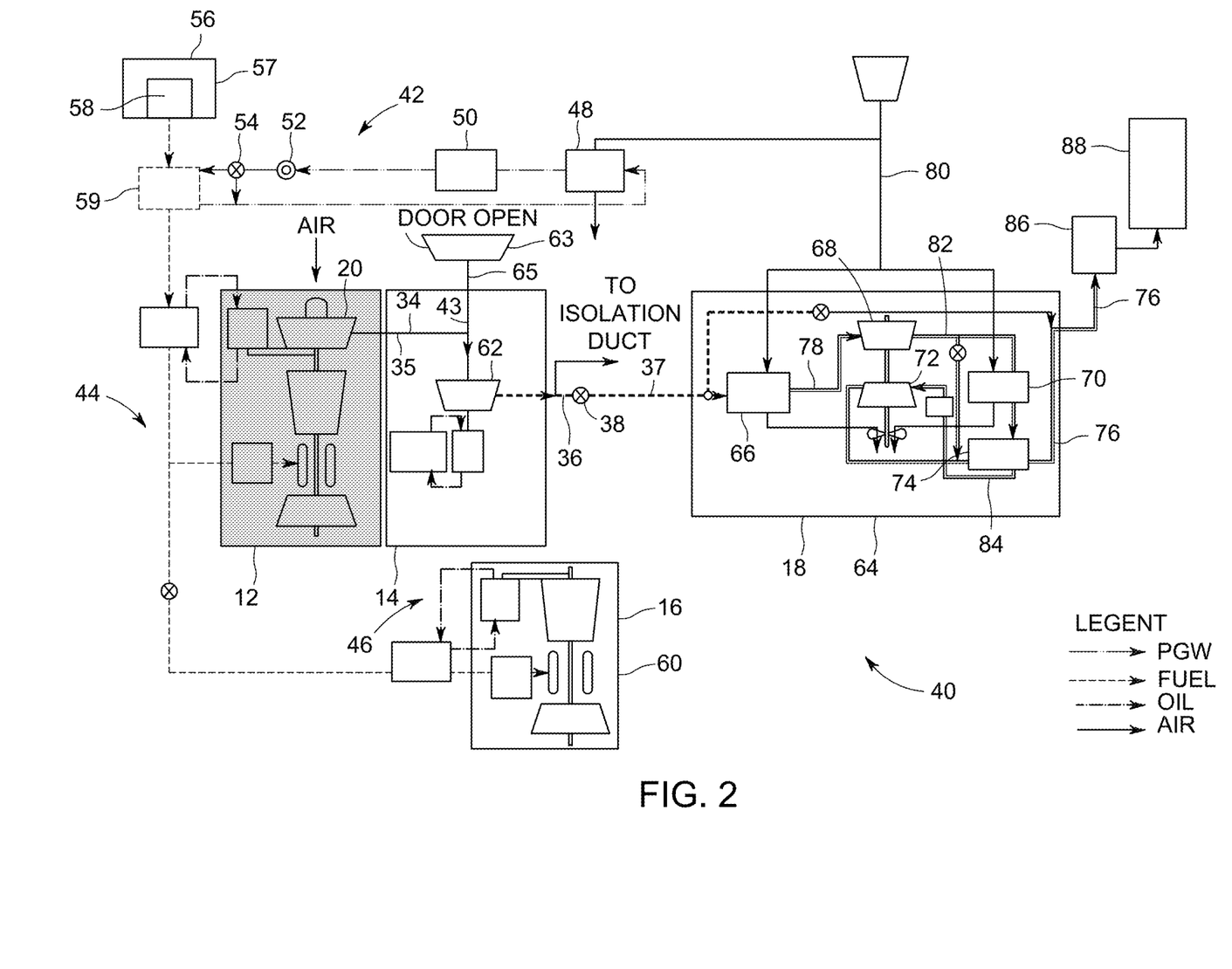
FIG. 2 is a schematic diagram of an aircraft energy management system incorporating engine fan discharge air constructed in accordance with an embodiment and operating in a ground cooling mode.
Figure 3:
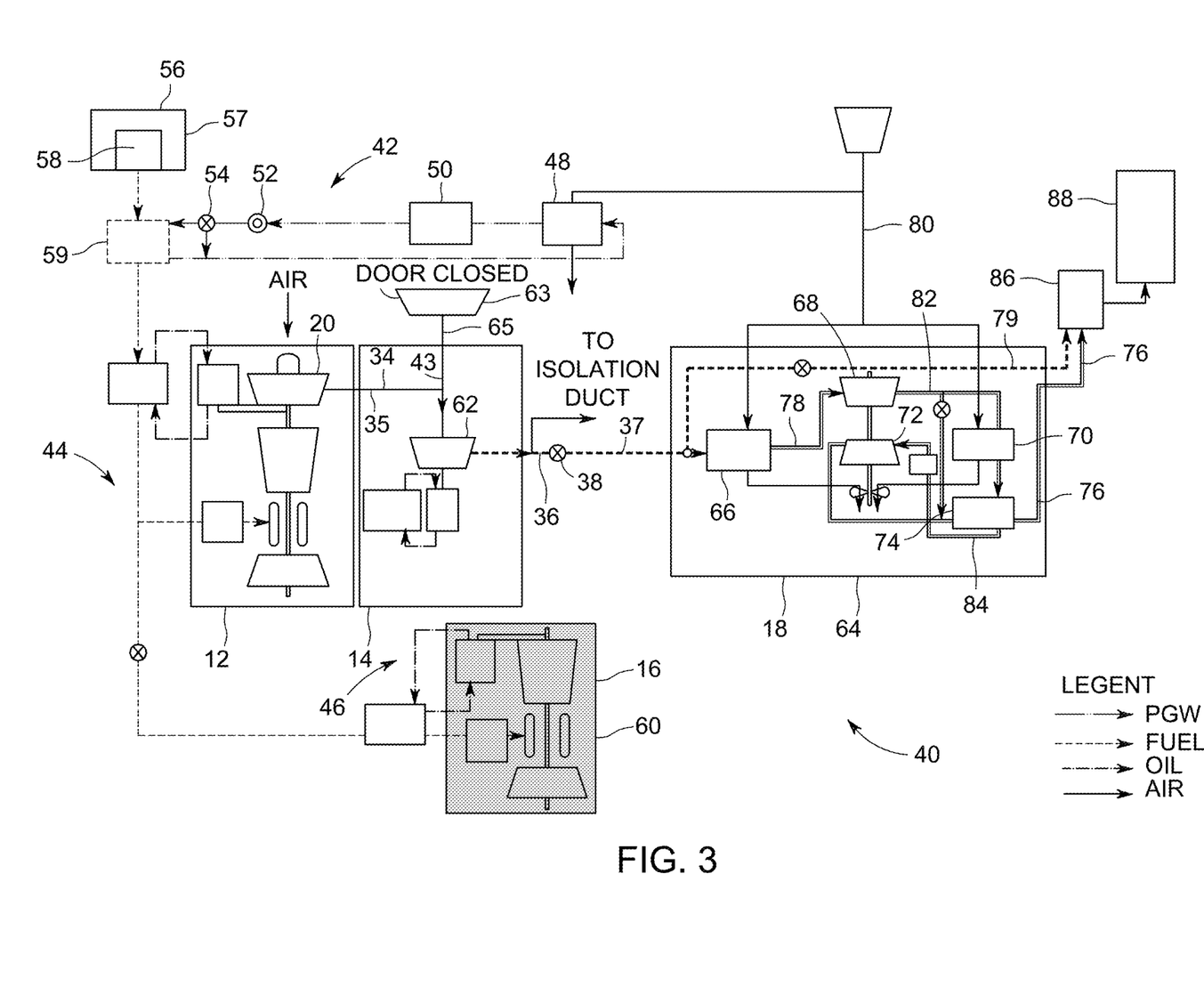
FIG. 3 is a schematic diagram of an aircraft energy management system incorporating engine fan discharge air constructed in accordance with an embodiment and operating in a flight partial cooling mode.
Figure 4:
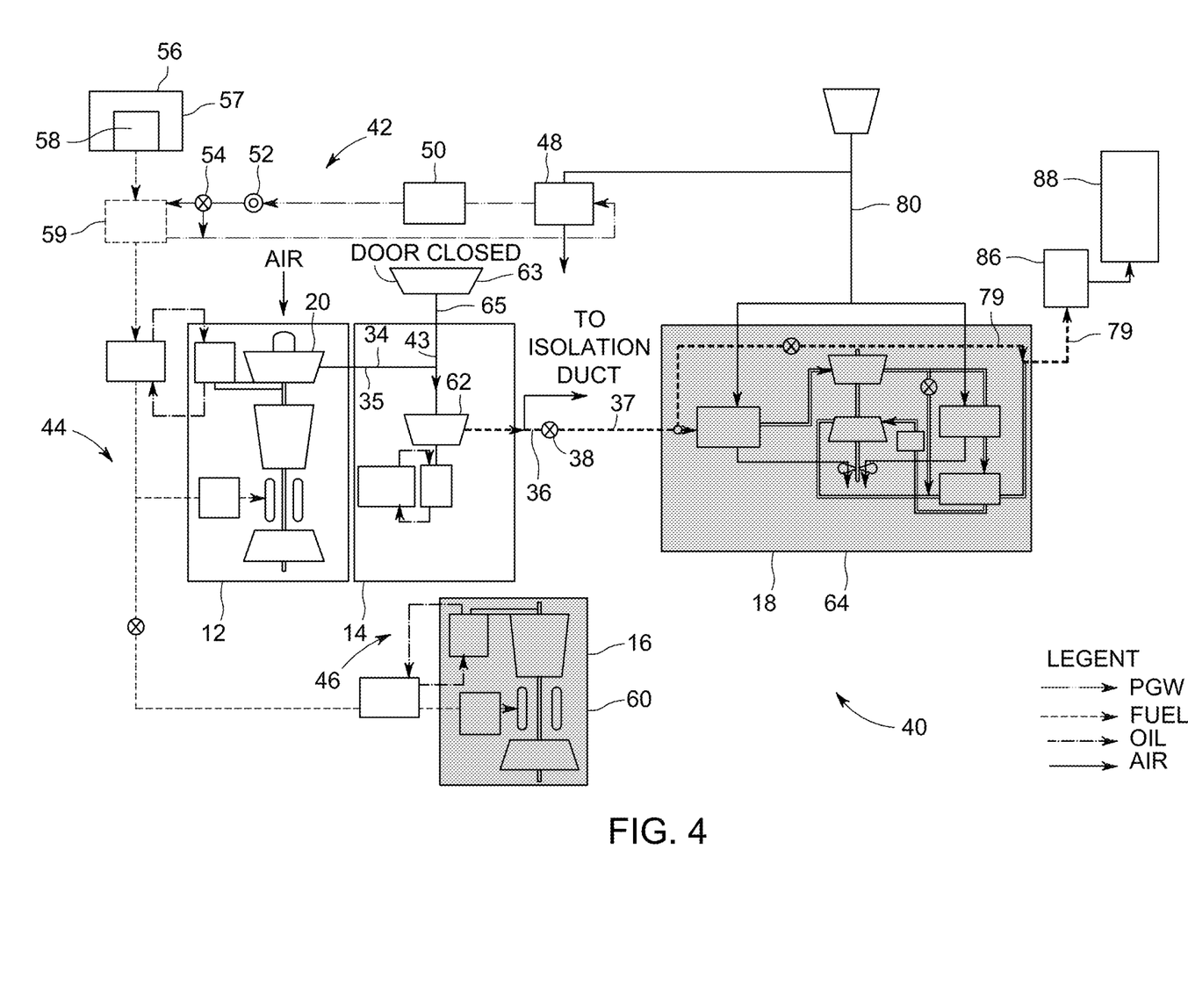
FIG. 4 is a schematic diagram of an aircraft energy management system incorporating engine fan discharge air constructed in accordance with an embodiment and operating in a flight heating mode.

Referring more specifically to FIGS. 2-4, illustrated is an energy management system 40, generally similar to energy management system 10 of FIG. 1. In the embodiment illustrated in FIGS. 2-4, the energy management system 40, and more particularly the ECS 18 is configured as an air cycle machine (ACM) 64. In an embodiment, the ACM 64 is laid out as a three-wheel system and is powered by the CAC 14 flow, and more particularly, the first compressed fluid flow 36.

Figure 5:
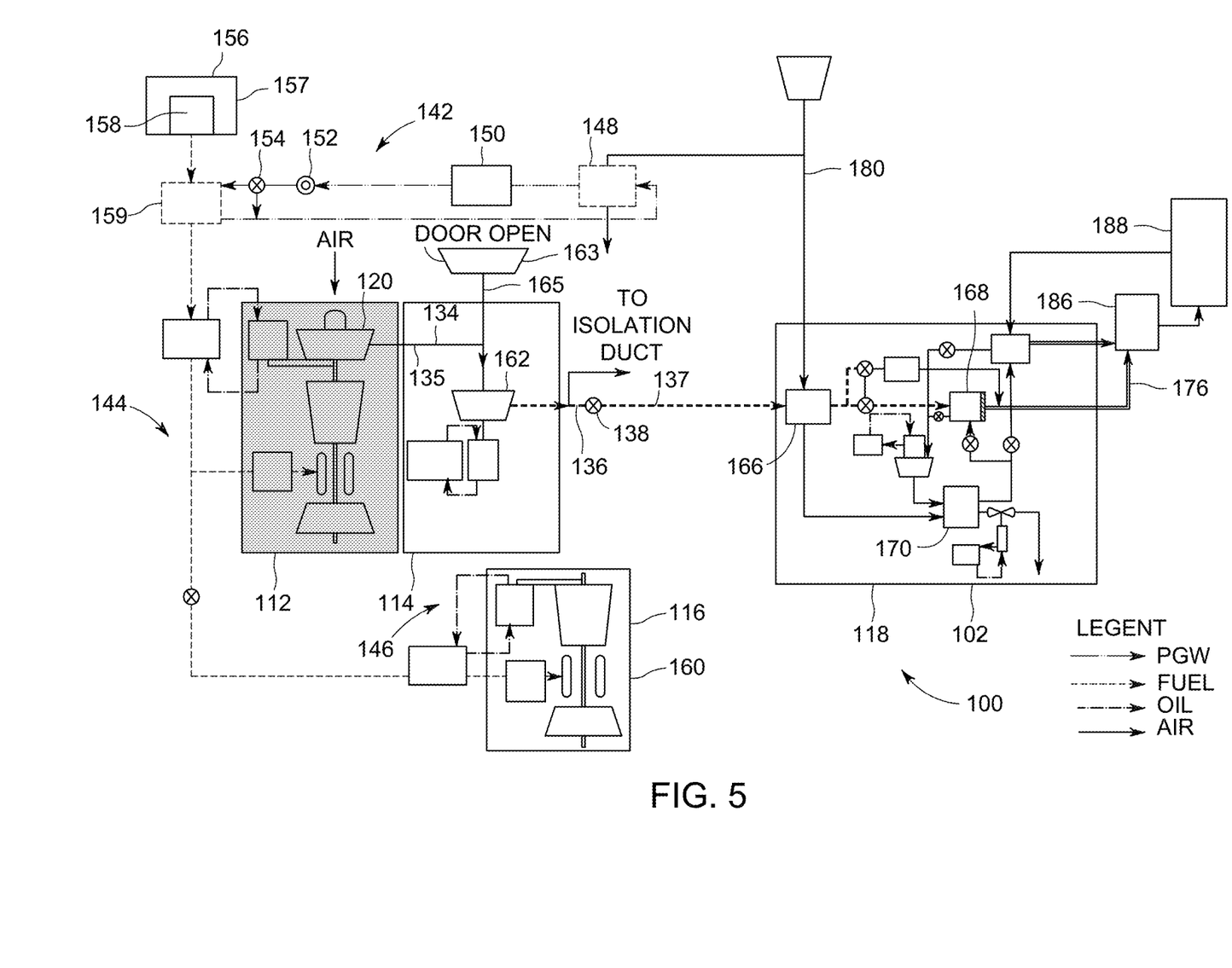
FIG. 5 is a schematic diagram of an aircraft energy management system incorporating engine fan discharge air constructed in accordance with an embodiment and operating in a ground cooling mode.

Depending on air conditioning needs, there are three main operation modes illustrated for the energy management system 40 to provide conditioned air to the cabin/cockpit: a ground cooling mode (FIG. 2), a flight partial cooling mode (FIG. 3) and a flight heating mode (FIG. 5). It should be understood that heating, partial cooling and cooling modes may be operated during in flight, or on ground, dependent upon configuration and power source (i.e. engine or ground power source). As best illustrated throughout FIGS. 2-7, the double solid lines indicate refrigerated airflow and the dashed line indicates heated airflow.

Energy management system 40 includes an engine 12, a CAC 14, a means for providing ground power 16 and an ECS 18. In addition, illustrated in FIGS. 2-4 are an optional liquid cooling loop 42, a fuel loop 44 and an oil and lube system 46 configured in fluid communication with the ECS 18. In an embodiment, the liquid cooling loop 42 is a propylene glycol/water (PGW) liquid cooling loop and may be included to cool a CAC motor controller. The liquid cooling loop 42 may include a PGW heat exchanger 48, a liquid cooled motor drive 50, a PGW pump 52 and a bypass valve 54. Additionally, illustrated in FIGS. 2-4 is a source of fuel 56, such as a fuel tank 57 including at least one fuel pump 58, in fluidic communication with a fuel heat exchanger 59.

Referring more specifically to FIG. 2, during the illustrated ground cooling mode, power is provided by the means for ground power 16, which in this particular embodiment is an APU 60, as previously described. In the illustrated ground cooling mode, the engine 12 is in an off mode and thus shown in shadow. A ram air 43 entering the CAC 14 is obtained from the ram air intake 63 via an inlet duct 65. The ram air 43 is input at an atmospheric pressure. The ram air 43 is directed toward the CAC 14 and compressed by a compressor 62 of CAC 14, generating the first compressed 36 at a pressure higher than the ram air 43 pressure. The first compressed fluid flow 36 is directed to the ECS 18 system via the duct 37. As previously indicated, in the illustrated embodiment, ECS 18 is configured as an air cycle machine (ACM) 64. During the ground cooling mode, the first compressed fluid flow 36 enters the ACM 64, passing through a primary heat exchanger 66, an ACM air compressor 68, a secondary heat exchanger 70, a turbine 72 and a condenser 74 before exiting the ACM 64 as a cooled compressed fluid flow 76. Cooling of the first compressed fluid flow 36 is provided in the primary and secondary heat exchangers 66, 70 wherein the first compressed fluid flow 36 is circulatable in heat exchange relationship with a portion of a ram air intake fluid flow 80 for cooling of the first compressed fluid flow 36 in the ACM 64. The primary ACM heat exchange unit 66 and the secondary ACM heat exchange unit 70 function to cool the first compressed fluid flow 36 in the energy management system 40.

In the illustrated ACM embodiment, there are two instances of heat exchange (may also be referred to as "intra-cycle" transfers of heat) between the first compressed fluid flow 36, at a mid-pressure with an atmospheric stream of the ram air intake fluid flow 80 and between a further compressed fluid flow, a second compressed fluid flow 82, at an outlet of the ACM compressor 68. In the first instance, the first compressed fluid flow 36 is circulated in heat exchange relationship with the ram air intake fluid flow 80 to cool the first compressed fluid flow 36 and generate a first cooled compressed fluid flow 78. In the second instance, a second compressed fluid flow 82 discharged from the compressor 68, is circulated in heat exchange relationship with the ram air intake fluid flow 80 to further cool the second compressed fluid flow 82 and generate a second cooled compressed fluid flow 84. This exchange of heat serves to cool or otherwise decrease the enthalpy of the first compressed fluid flow 36, so that the second cooled compressed fluid flow 84 may then undergo an expansion in the ACM turbine 72 prior to being discharged from the ACM 64, having passed through the condenser 74, as a conditioned fluid flow 76. The conditioned fluid flow 76 is next provided to a mixing duct 86 for subsequent flow into the aircraft cabin or cockpit 88.

Referring now to FIG. 3, illustrated is operation of the energy management system 40 in a flight partial cooling mode. It should be understood that the overall architecture of the energy management system 40 remains the same as previously described with respect to FIG. 2, yet able to operate in a different operating mode dependent upon utilized components. More specifically, during the illustrated flight partial cooling mode, power is provided by the engine 12 and thus the means for providing ground power 16, and more particularly the APU 60, is shown in shadow. In contrast to the previous ground mode of operation, a fan bleed flow entering the CAC 14 is obtained from the engine fan 20 as fan discharge fluid flow 34. The fan discharge fluid flow 34 is directed toward the CAC 14 via inlet duct 35 and compressed by a compressor 62 of CAC 14, generating a compressed fluid flow 36 that is directed to the ECS 18 system via duct 37.

As illustrated, the inlet duct 35 is coupled between an inlet of the CAC compressor 64 and a source of high-pressure, high-temperature engine fan air extracted from the engine fan 20. A combined pressure regulating and shut-off valve (PR-SOV) (not shown) may be placed in the inlet duct 35 and operated by an actuator. The shut-off valve is effective to provide the fan discharge fluid flow 34 to the CAC compressor 64 at a desired set point pressure, and to shut off the fan discharge fluid flow 34 completely when desired. Optionally, a combination of separate valve components in series may be used to achieve the same function. Duct 37 couples the discharge from an exit of the CAC compressor 64 and the ECS 18. As shown in FIG. 3, the duct 37 is connected to the ECS 18 by a shut-off valve (SOV) 38 which is operated by an actuator. In operation, engine fan discharge fluid flow 34, at relatively low pressure and temperature, is discharged from the engine fan 20 and introduced to the CAC compressor 64. Work input from the CAC compressor 64 increases the fan discharge air temperature and pressure. The CAC compressor 64 discharges the compressed fluid flow 36 and provides it to the ECS 18 through the shut-off valve 38 and duct 37.

As previously indicated with respect to FIG. 2, in the illustrated embodiment, ECS 18 is configured as an air cycle machine (ACM) 64. During the flight partial cooling mode, a portion of the compressed fluid flow 36 enters the ACM 64, passing through the primary heat exchanger 66, the ACM air compressor 68, the secondary heat exchanger 70, the turbine 72 and the condenser 74 before exiting the ACM 64 as a conditioned fluid flow 76. Similar to ground cooling mode described with respect to FIG. 2, cooling of the compressed fluid flow 36 is provided in the primary and secondary heat exchangers 66, 70 wherein the compressed fluid flow 36 is circulatable in heat exchange relationship with a portion of a ram air intake fluid flow 80 for cooling of the compressed fluid flow 36 in the ACM 64. In addition, a portion of the compressed fluid flow 36 passes through the ACM 64 as a high pressure heated fluid flow 79 where it is mixed with the conditioned fluid flow 76 in a mixing duct 86, prior to delivery to the cabin or cockpit 88.

Referring now to FIG. 4, illustrated is operation of the energy management system 40 in a flight heating mode. It should again be understood that the overall architecture of the energy management system 40 remains the same as previously described with respect to FIGS. 2 and 3, yet able to operate in a different operating mode dependent upon utilized components. More specifically, during the illustrated flight heating mode, power is provided by the engine 12 and thus the means for providing ground power 16, and more particularly the APU 60, is shown in shadow. Similar to the previously described modes of operation, a fan bleed flow entering the CAC 14 is obtained from the engine fan 20 as fan discharge fluid flow 34. The fan discharge fluid flow 34 is directed toward the CAC 14 via duct 35 and compressed by a compressor 62 of CAC 14, generating a compressed fluid flow 36 that is directed to the ECS 18 system via duct 37. As previously indicated, in the illustrated embodiment, ECS 18 is configured as an air cycle machine (ACM) 64. During the flight heating mode, the compressed fluid flow 36 enters the ACM 64 and passes directly therethrough, bypassing the primary heat exchanger 66, the ACM air compressor 68, the secondary heat exchanger 70, the turbine 72 and the condenser 74, exiting the ACM 64 as a heated fluid flow 79. The heated fluid flow 79 is thereafter directed to the aircraft cabin or cockpit 88.

Figure 6:
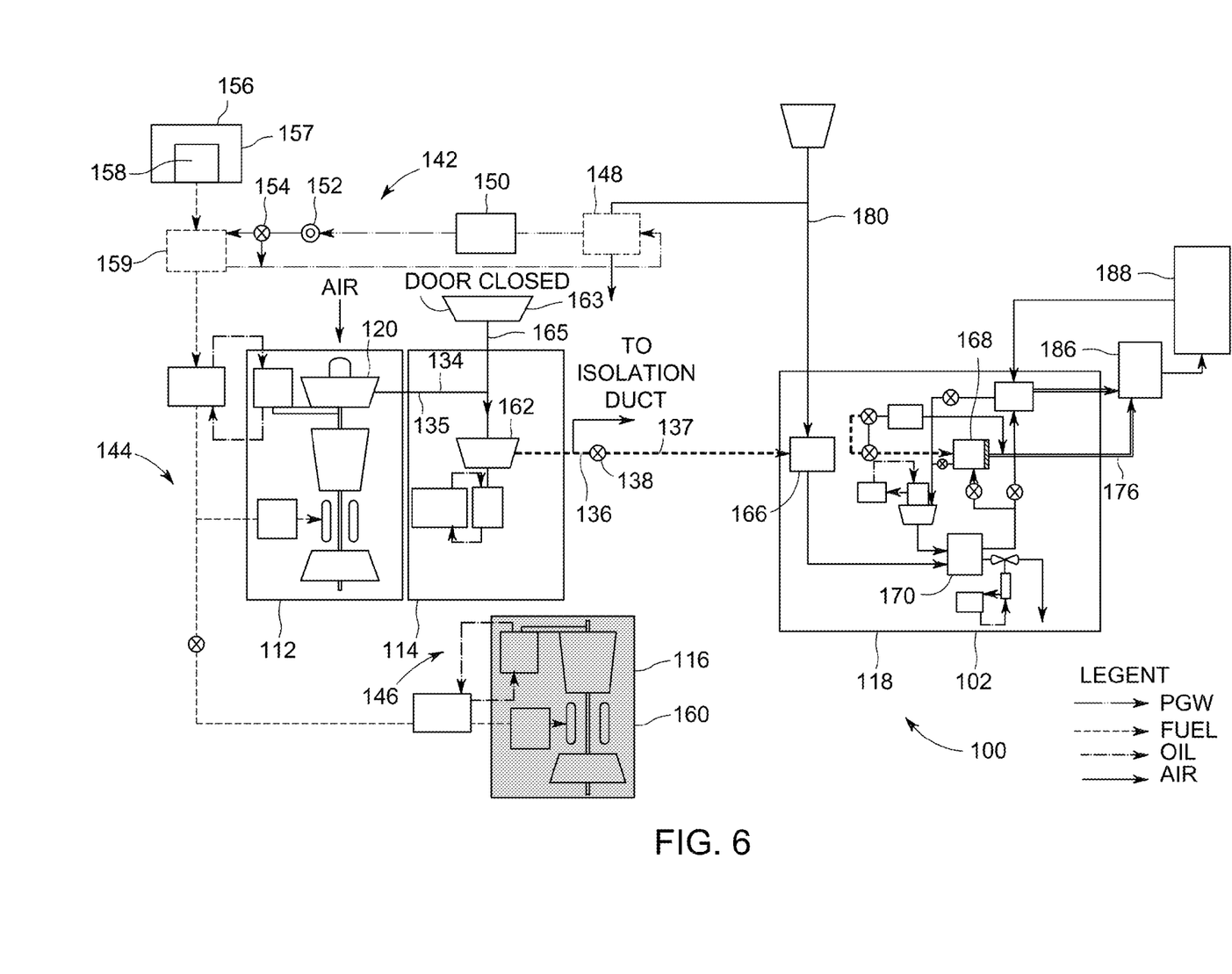
FIG. 6 is a schematic diagram of an aircraft energy management system incorporating engine fan discharge air constructed in accordance with an embodiment and operating in a flight cooling mode.
Figure 7:
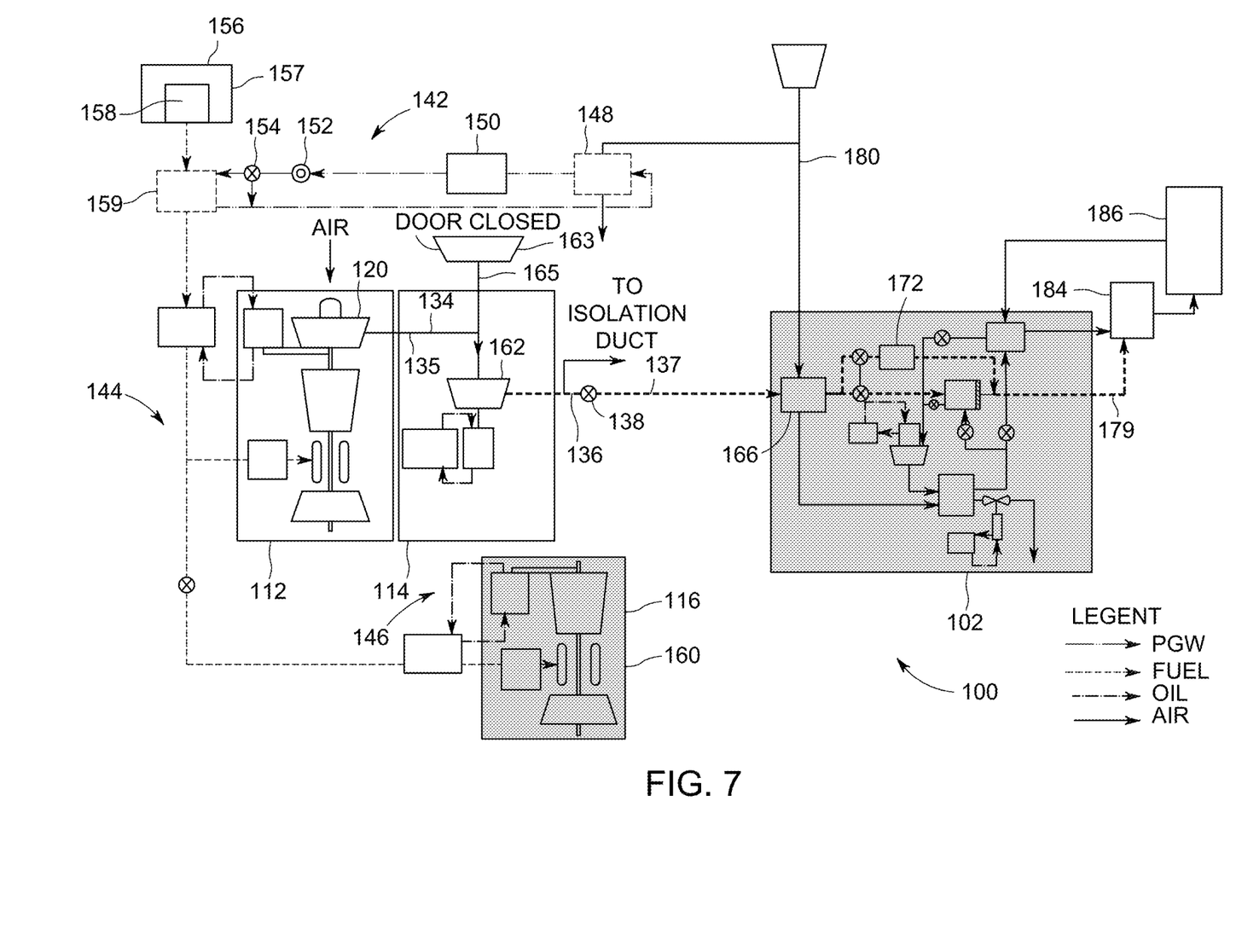
FIG. 7 is a schematic diagram of an aircraft energy management system incorporating engine fan discharge air constructed in accordance with an embodiment and operating in a flight heating mode.

Referring now to FIGS. 5-7, illustrated is an energy management system 100, generally similar to energy management system 10 of FIG. 1. In the embodiment illustrated in FIGS. 5-7, the energy management system 100, and more particularly an ECS 118 is configured as an electric vapor cycle system (VCS) 102. In an embodiment, the VCS 102 is powered by a CAC 114 flow, and more particularly, a compressed fluid flow 136 via duct 137. Depending on air conditioning needs, there are three main operation modes illustrated for the energy management system 100 to provide conditioned air to the cabin/cockpit 188: a ground cooling mode (FIG. 5), a flight cooling mode (FIG. 6), and a flight heating mode (FIG. 7). As with the embodiment described with respect to FIGS. 2-4, it should be understood that heating, partial cooling and cooling modes may be operated during in flight, or on ground, dependent upon configuration and power source (i.e. engine or ground power source). As previously indicated, throughout the drawings, the double solid lines indicate refrigerated airflow and the dashed line indicates heated airflow.

The energy management system 100 illustrated in FIGS. 5-7 includes an engine 112, a CAC 114, a means for providing ground power 116 and an ECS 118. In addition, illustrated are an optional liquid cooling loop 142, a fuel loop 144 and an oil and lube system 146 configured in fluid communication with the ECS 118. In an embodiment, the liquid cooling loop 142 is a propylene glycol/water (PGW) liquid cooling loop and may be included to cool a CAC motor controller. The liquid cooling loop 142 may include a PGW heat exchanger 148, a liquid cooled motor drive 150, a PGW pump 152 and a bypass valve 154. Additionally, illustrated is a source of fuel 156, such as a fuel tank 157 including at least one fuel pump 158, in fluidic communication with a fuel heat exchanger 159.

During a ground cooling mode as best illustrated in FIG. 5, power is provided by the means for ground power 116, which in this particular embodiment is an APU 160, as previously described with respect to FIGS. 1-4. In the illustrated ground cooling mode, the engine 112 is in an off mode and thus shown in shadow. A ram air 165 entering the CAC 114 is obtained from the ram air intake 163 via an inlet duct 165. The ram air 165 is directed toward the CAC 114 and compressed by a compressor 162 of CAC 114, generating a compressed fluid flow 136 to the ECS 118 system via duct 137. As previously indicated, in the illustrated embodiment ECS 18 is configured as an electric vapor cycle system (VCS) 102. During the ground cooling mode, the compressed fluid flow 136 enters the VCS 102, passing through a heat exchanger 166 and a first evaporator 168 before exiting the VCS 102 as a conditioned fluid flow 176. Cooling of the compressed fluid flow 136 is provided in the primary heat exchanger 166 wherein the compressed fluid flow 136 is circulatable in heat exchange relationship with a portion of a ram air intake fluid flow 180 for cooling of the compressed fluid flow 136 in the VCS 102. The heat exchange unit 166 functions to cool the fan discharge air 134 in the energy management system 100. The conditioned fluid flow 176 is next provided to a mixing duct 186 for subsequent flow into the aircraft cabin or cockpit 188.

Referring now to FIG. 6, illustrated is operation of the energy management system 100 in a flight cooling mode. It should be understood that the overall architecture of the energy management system 100 remains the same as previously described with respect to FIG. 5, yet able to operate in a different operating mode dependent upon utilized components. More specifically, during the illustrated flight cooling mode, power is provided by the engine 112 and thus the means for providing ground power 116, and more particularly an APU 160, is shown in shadow. Similar to the previously described mode of operation, a ram air 165 entering the CAC 114 is obtained from the ram air intake 163 via an inlet duct 165. The ram air 165 is directed toward the CAC 114 and compressed by a compressor 162 of CAC 114, generating a compressed fluid flow 136 to the ECS 118 system. As previously indicated, in the illustrated embodiment, ECS 118 is configured as a VCS 102. During the flight cooling mode, the compressed fluid flow 136 enters the VCS 102, passing through a heat exchanger 166 and a first evaporator 168 before exiting the VCS 102 as a conditioned fluid flow 176. Cooling of the compressed fluid flow 136 is provided in the primary heat exchanger 166 wherein the compressed fluid flow 136 is circulatable in heat exchange relationship with a portion of a ram air intake fluid flow 180 for cooling of the compressed fluid flow 136 in the VCS 102. The heat exchange unit 166 functions to cool the fan discharge air 134 in the energy management system 100. The conditioned fluid flow 176 is next provided to a mixing duct 186 for subsequent flow into the aircraft cabin or cockpit 188.

Referring now to FIG. 7, illustrated is operation of the energy management system 100 in a flight heating mode. It should again be understood that the overall architecture of the energy management system 100 remains the same as previously described with respect to FIGS. 5 and 6, yet able to operate in a different operating mode dependent upon utilized components. More specifically, during the illustrated flight heating mode, power is provided by the engine 112 and thus the means for providing ground power 116, and more particularly the APU 160, is shown in shadow. In contrast to the previously described modes of operation and in light of engine operation in flight, a fan bleed flow entering the CAC 114 is obtained from the engine fan 120 as fan discharge fluid flow 134. The fan discharge fluid flow 134 is directed toward the CAC 114 and compressed by a compressor 162 of CAC 114, generating a compressed fluid flow 136 to the ECS 118 system. As previously indicated, in the illustrated embodiment, ECS 118 is configured as a VCS 102. During the flight heating mode, the compressed fluid flow 136 enters the VCS 102, and passes directly therethrough, bypassing the heat exchanger 166 and exiting the VCS 102 as a conditioned fluid flow 179. In an embodiment, a heating element 172 may be provided to provide additional heat to compressed fluid flow 136 when indicated. The heated compressed air flow 179 is next provided to a mixing duct 184 for subsequent flow into the aircraft cabin or cockpit 186.

Figure 8:
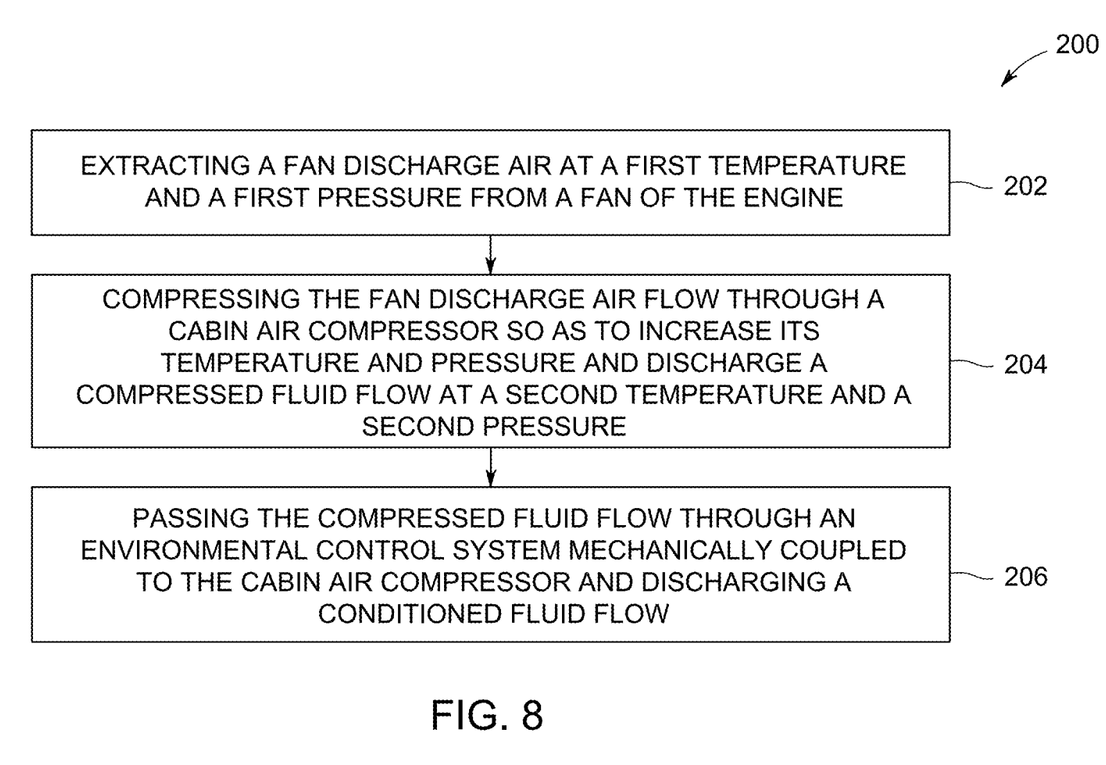
FIG. 8 is a schematic block diagram of a method of extracting fan discharge air from a gas turbine engine in an energy management system.

FIG. 8 is a schematic block diagram of a method 200 of extracting fan discharge air from a gas turbine engine in an energy management system. Generally, the method involves extracting a fan discharge air flow at a first temperature and a first pressure from a fan of the engine, at a step 202. Next in step 204, the fan discharge air flow is compressed through a cabin air compressor so as to increase its temperature and pressure and discharge a compressed fluid flow at a second temperature and a second pressure. In step 206, the compressed fluid flow is passed through an environmental control system mechanically coupled to the cabin air compressor and discharging a conditioned fluid flow. As previously described, the environmental control system is one of a air cycle machine (ACM) or a vapor cycle system (VCS). The system is configured to operate in one of an inflight heating mode, an inflight cooling mode, an inflight partial cooling mode, a ground heating mode, a ground cooling mode and a ground partial cooling mode.

Accordingly, disclosed is an energy management system including a cabin air compressor and an environmental control system configured to intake a fluid flow from an engine fan discharge and cooling air from a variable geometry ram air inlet, resulting in a decrease in overall aircraft weight and reduction in drag. The utilization of the engine fan discharge fluid flow enables a new energy management system that may provide a potential benefit with respect to fuel savings in aircraft employing the system. It will be understood that the previous modes of operation described herein are merely examples of proposed operating conditions. What is significant is the system provides for fresh air intake during a ground mode of operation, and an engine fan discharge air intake during an inflight mode of operation, thereby providing for a low pressure, low temperature interface to an aircraft ECS that is compatible with the temperature limitations and weight limitations of an aircraft, while minimizing the typical drag inefficiencies.

The foregoing has described an energy management system for a gas turbine engine. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. An aircraft energy management system comprising:
a cabin air compressor adapted to be coupled to a source of fan discharge air at a first pressure and configured to receive a flow of fan discharge air during an inflight operating mode and adapted to be coupled to a ram air intake and configured to receive a flow of ram air during a ground operating mode, and discharge a compressed fluid flow; and
an environmental control system mechanically coupled to a compressor exit of the cabin air compressor to receive the compressed fluid flow.

2. The aircraft energy management system as claimed in claim 1, wherein the environmental control system is an air cycle machine (ACM).

3. The aircraft energy management system as claimed in claim 1, wherein the environmental control system is a vapor cycle system (VCS).

4. The aircraft energy management system as claimed in claim 1, wherein the source of fan discharge air is a gas turbine engine.

5. The aircraft energy management system as claimed in claim 4, wherein the gas turbine engine comprises:
a turbomachinery core including a high pressure compressor, a combustor, and a high pressure turbine in serial flow relationship, the core operable to produce a first pressurized flow of air;
a low pressure turbine disposed downstream of the core and operable to drive a fan to produce the fan discharge air.

6. The aircraft energy management system as claimed in claim 1, wherein the cabin air compressor is further adapted to be coupled to a means for providing ground power during the ground operating mode.

7. The aircraft energy management system as claimed in claim 6, wherein the means for providing ground power is an auxiliary power unit (APU).

8. The aircraft energy management system as claimed in claim 1, wherein the system is configured to operate in one of an inflight heating mode, an inflight cooling mode, an inflight partial cooling mode, a ground heating mode, a ground cooling mode and a ground partial cooling mode.

9. The aircraft energy management system as claimed in claim 1, wherein the environmental control system includes at least one heat exchanger coupled to the cabin air compressor.

10. The aircraft energy management system as claimed in claim 1, further comprising a shut-off valve disposed downstream of the cabin air compressor.

11. The aircraft energy management system as claimed in claim 1, further comprising a liquid cooling loop in fluidic communication with the cabin air compressor.

12. An aircraft energy management system comprising:
a gas turbine engine comprising a turbomachinery core including a high pressure compressor, a combustor, and a high pressure turbine in serial flow relationship, the core operable to produce a first pressurized flow of air and a low pressure turbine disposed downstream of the core and operable to drive a fan to produce a second pressurized flow of air;
a cabin air compressor mechanically coupled to the gas turbine engine and having a compressor inlet coupled to the fan and a fresh air intake, the cabin air compressor configured to receive the second pressurized flow of air from the fan during an inflight operating mode at a first pressure and a ram air fluid flow at a second pressure during a ground operating mode, and discharge a compressed fluid flow at a third pressure substantially higher than the first pressure and the second pressure; and
an environmental control system mechanically coupled to the cabin air compressor and having an inlet coupled to a compressor exit of the cabin air compressor to receive the compressed fluid flow and discharge a conditioned fluid flow.

13. The aircraft energy management system as claimed in claim 12, wherein the cabin air compressor is coupled to a means for providing ground power during the ground operating mode.

14. The aircraft energy management system as claimed in claim 13, wherein the means for providing ground power is an auxiliary power unit (APU).

15. The aircraft energy management system as claimed in claim 12, wherein the environmental control system is an air cycle machine (ACM).

16. The aircraft energy management system as claimed in claim 12, wherein the environmental control system is a vapor cycle system (VCS).

17. The aircraft energy management system as claimed in claim 12, wherein the system is configured to operate in one of an inflight heating mode, an inflight cooling mode, an inflight partial cooling mode, a ground heating mode, a ground cooling mode and a ground partial cooling mode.

18. A method of extracting fan discharge air from a gas turbine engine in an energy management system, comprising:
  extracting a fan discharge air flow at a first temperature and a first pressure from a fan of the engine during an inflight operating mode and extracting a ram air fluid flow at a second pressure from a ram air intake during a ground operating mode, wherein the gas turbine engine comprises a turbomachinery core including a high pressure compressor, a combustor, and a high pressure turbine in serial flow relationship, the core operable to produce a first pressurized flow of air and a low pressure turbine disposed downstream of the core and operable to drive the fan to produce a second pressurized flow of air;
  compressing the fan discharge air flow through a cabin air compressor so as to increase its temperature and pressure during the inflight operating mode and compressing the ram air fluid flow through the cabin air compressor so as to increase its temperature and pressure during the ground operating mode, and discharging a compressed fluid flow at a third pressure substantially higher than the first pressure and the second pressure; and
  passing the compressed fluid flow through an environmental control system mechanically coupled to the cabin air compressor to receive the compressed fluid flow and discharging a conditioned fluid flow.

19. The method of of extracting fan discharge air from a gas turbine engine as claimed in claim 18, wherein the environmental control system is one of a air cycle machine (ACM) or a vapor cycle system (VCS).

20. The method of of extracting fan discharge air from a gas turbine engine as claimed in claim 18, wherein the system is configured to operate in one of an inflight heating mode, an inflight cooling mode, an inflight partial cooling mode, a ground heating mode, a ground cooling mode and a ground partial cooling mode.

* * * * *